United States Patent
Moniri et al.

(10) Patent No.: US 11,745,095 B2
(45) Date of Patent: Sep. 5, 2023

(54) AUTOMOTIVE ENTERTAINMENT APPLICATIONS

(71) Applicant: Cerence Operating Company, Burlington, MA (US)

(72) Inventors: Mohammad Mehdi Moniri, Aachen (DE); Aditya Gulati, Aachen (DE)

(73) Assignee: Cerence Operating Company, Burlington, MA (US)

( * ) Notice: Subject to any disclaimer, the term of this patent is extended or adjusted under 35 U.S.C. 154(b) by 0 days.

(21) Appl. No.: 17/111,868

(22) Filed: Dec. 4, 2020

(65) Prior Publication Data

US 2022/0176237 A1 Jun. 9, 2022

(51) Int. Cl.
| | | |
|---|---|---|
| *A63F 13/215* | (2014.01) | |
| *G06F 3/01* | (2006.01) | |
| *A63F 13/213* | (2014.01) | |
| *A63F 13/216* | (2014.01) | |
| *A63F 13/285* | (2014.01) | |
| *B60K 37/02* | (2006.01) | |
| *G10L 15/26* | (2006.01) | |
| *A63F 13/217* | (2014.01) | |
| *G06V 20/59* | (2022.01) | |

(52) U.S. Cl.
CPC .......... *A63F 13/215* (2014.09); *A63F 13/213* (2014.09); *A63F 13/216* (2014.09); *A63F 13/217* (2014.09); *A63F 13/285* (2014.09); *B60K 37/02* (2013.01); *G06F 3/012* (2013.01); *G06F 3/017* (2013.01); *G06V 20/593* (2022.01); *G10L 15/26* (2013.01); *B60K 2370/164* (2019.05)

(58) Field of Classification Search
CPC .... A63F 13/215; A63F 13/213; A63F 13/216; A63F 13/217; A63F 13/285; G06F 3/012; G06F 3/017; G10L 15/26
See application file for complete search history.

(56) References Cited

U.S. PATENT DOCUMENTS

| | | | |
|---|---|---|---|
| 2007/0149284 A1* | 6/2007 | Plavetich | A63F 13/00 463/37 |
| 2008/0311983 A1* | 12/2008 | Koempel | A63F 13/52 463/31 |
| 2009/0034798 A1* | 2/2009 | Mueller-Schneiders | G06V 20/582 382/104 |
| 2010/0253918 A1* | 10/2010 | Seder | G08G 1/165 353/13 |
| 2014/0128144 A1* | 5/2014 | Bavitz | A63F 13/65 463/23 |
| 2014/0128145 A1* | 5/2014 | Hwang | A63F 13/00 463/23 |

(Continued)

*Primary Examiner* — David L Lewis
*Assistant Examiner* — Shauna-Kay Hall
(74) *Attorney, Agent, or Firm* — Occhiuti & Rohlicek LLP (57) ABSTRACT

An apparatus for entertaining an entertainee in a passenger vehicle includes an infotainment system having an automotive assistant that executes a spatially-cognizant entertainment application that interacts with the entertainee. In doing so, the automotive assistant receives information about the vehicle's environment from peripheral devices connected to the infotainment system. This provides the entertainment application with spatial intelligence that it then uses while interacting with the entertainee.

26 Claims, 6 Drawing Sheets

(56) References Cited

U.S. PATENT DOCUMENTS

| | | | | |
|---|---|---|---|---|
| 2014/0128146 | A1* | 5/2014 | Story, Jr. | A63F 13/217 |
| | | | | 463/36 |
| 2014/0148988 | A1* | 5/2014 | Lathrop | B60W 50/14 |
| | | | | 701/23 |
| 2014/0309806 | A1* | 10/2014 | Ricci | G05D 23/1917 |
| | | | | 701/1 |
| 2015/0100179 | A1* | 4/2015 | Alaniz | G02B 27/017 |
| | | | | 701/1 |
| 2016/0346695 | A1* | 12/2016 | Hoory | A63F 13/65 |
| 2017/0136969 | A1* | 5/2017 | Drescher | H04B 1/3822 |
| 2017/0334357 | A1* | 11/2017 | Lewis | G06T 7/11 |
| 2018/0357040 | A1* | 12/2018 | Spiewla | G06F 3/0488 |
| 2019/0318181 | A1* | 10/2019 | Katz | B60W 40/08 |
| 2020/0073520 | A1* | 3/2020 | Mohan | G06Q 30/0235 |
| 2020/0372263 | A1* | 11/2020 | Song | G05D 1/0278 |
| 2020/0388285 | A1* | 12/2020 | Spiewla | G06F 3/167 |

* cited by examiner

AUTOMOTIVE ENTERTAINMENT APPLICATIONS

BACKGROUND

This invention relates to applications and, in particular, to entertainment applications in which a vehicle's processing system is an active participant.

Passengers are often reluctant to undertake a long journey in an automobile. Although some of this reluctance arises from the risk of travel and from the physical discomfort of being seated for an extended period, a significant contributor is the anticipation of boredom.

Passengers have used a variety of ways to relieve the ennui of extended travel. Reading books and, more recently, watching movies are both proven techniques for relieving boredom. Another method is to play games.

A difficulty associated with playing games is that one must find someone to play with. In the context of a family road trip, the children in the same family will usually be of different ages. As a result, their differing stages of development make playing together more challenging. In other cases, passengers may be asleep or may prefer to engage in another of the ennui-suppression activities outlined above.

SUMMARY

The invention involves an automotive processing-unit that includes an infotainment system. The infotainment system executes spatially-cognizant entertainment applications. The spatial cognizance of these entertainment applications arises from their ability to use spatial intelligence to entertain an entertainee. In effect, the entertainment application is aware of its surroundings and uses that awareness to make the entertainment application more entertaining than it otherwise could be.

As part of the automotive processing-unit, the infotainment system has access to a one or more sensors. The infotainment system is thus able to use those sensors to gather spatial intelligence, thus allowing it to respond to changes in the vehicle's environment just as a human being might do.

In some embodiments, the infotainment system has access to cameras pointing both inside and outside the vehicle. Thus, by implementation of suitable machine vision methods, the infotainment system accesses these images and infers, for example, an entertainee's gaze direction or gestures. Because of its access to an external camera, the infotainment system is able to recognize dynamically changing features of the environment and to dynamically vary the operation of the entertainment application in response to those changing features.

In some embodiments, the automotive processing-unit includes a geo-positioning system. As such, the infotainment system has access to the vehicle's location coordinates. This can be correlated with a database of features associated with those coordinates. This permits the entertainment application to comment on external features that are present in the environment during the course of its operation. This results in the entertainment application's increased ability to simulate a human participant, and thus its entertainment value to an entertainee.

The geo-positioning system, when coupled with a timer, also provides other kinematic variables, such as vehicle velocity. In some embodiments, the infotainment system uses such information to anticipate features that will soon come into view. This information can likewise be incorporated into the application's operation as necessary.

Between its ability to observe the entertainee's gaze and gestures, its ability to recognize external features in the car's environment, and its ability to anticipate features that have yet to come into view, the infotainment system is endowed with spatial intelligence. As a result of such spatial intelligence, the infotainment system is able to identify the existence of features in space and various kinematic properties of those features as measured from the vehicle's moving frame-of-reference. These kinematic variables include a position vector relative to the vehicle and a velocity vector relative to the vehicle. From such information, the infotainment system makes inferences concerning when particular features will come into view and slip out of view as seen from the vehicle. The resulting spatial intelligence enables the design of new types of entertainment applications that have hitherto never existed. Three non-limiting examples are described herein.

The convergence of spatial intelligence and entertainment applications in a moving vehicle results in a certain synergy that improves the entertainment value of those applications. For example, in those entertainment applications that implement a game or any virtual reality world, the constantly changing environment provides a naturally occurring backdrop against which to play a game. As an example, an entertainment application may show moving images of what the vehicle's environment looked like at some point in the past. This avoids the need for the application to generate its own background scenery while simultaneously using scenery that is actually present and hence more relevant. This provides greater immediacy that tends to capture and hold the entertainee's attention for extended periods.

By using spatial intelligence, the entertainment applications described herein are able to use existing scenery that the vehicle would naturally traverse and essentially incorporate it into the entertainment application with a dynamically-changing backdrop that changes with the seasons and is inherently rife with randomly-occurring events.

In some embodiments, the entertainment application is a game. In such cases, the vehicle becomes, in effect, a game controller or a game interface that traverses a physical environment that is itself the environment in which the game is ultimately played.

A particularly useful ability in an entertainment application is that of communicating with the entertainee. An infotainment system described herein features a speech interface that permits such communication. In addition, the infotainment system has, available to it, other avenues of communication. For example, the head unit can activate lights within the car's cabin in particular ways. In those vehicles equipped with haptic elements, it is possible to activate haptic elements according to particular patterns, both spatial and temporal, in such a way as to communicate with the entertainee.

In one aspect, the invention features using an infotainment system of a passenger vehicle to entertain an entertainee in the passenger vehicle. Using the infotainment system includes executing an automotive assistant that is configured to execute an entertainment application. This automotive assistant executes the steps of gathering spatial intelligence about the environment of the vehicle from a peripheral-device set that is are connected to the infotainment system. The peripheral-device set comprises one or more peripheral devices. The automotive assistant then uses that gathered spatial intelligence while executing the entertainment application.

In some practices, gathering spatial intelligence includes receiving image information from outside of the vehicle and location information indicative of the geographic location of the vehicle.

Examples of peripheral devices from which spatial intelligence can be gathered are external and internal sensors of radiation, including acoustic and electromagnetic radiation. Preferably the radiation is within a range of wavelengths that is perceptible to the entertainee. A suitable range of electromagnetic radiation is that spanning wavelengths between about four hundred and seven hundred nanometers. A suitable range of acoustic radiation is that in which waves oscillate between twenty and twenty-thousand times for each second that passes. A suitable sensor for electromagnetic radiation camera. A useful sensor for acoustic radiation is a microphone. A useful device for gathering information indicative of geographical location is a geographical positioning system.

Among the practices of the method are those that include using the gathered spatial intelligence to identify a feature in the environment and providing the entertainee with a hint to assist the entertainee in identifying the feature. Such a hint is information about the feature that does not identify the feature but that tends to increase the probability that the entertainee will correctly identify the feature. Among these are practices that include, in response to requests from the entertainee, providing additional hints to assist the entertainee in identifying the feature.

Further practices include those in which the spatial intelligence is used to identify a first feature in the environment and to provide the entertainee with a hint to assist the entertainee in identifying the feature. Such practices include receiving, from the entertainee, information identifying the first feature. In some of these practices, the information received from the entertainee takes the form of an utterance. In others, it takes the form of a gesture by the entertainee. Such a gesture is then interpreted as an identifying the entertainee's expectation of a direction to the feature.

Still further practices include using the spatial intelligence to identify a first feature in the environment, providing the entertainee with a hint to assist the entertainee in identifying the feature, and obtaining, from a speech interface, information indicative of a second feature that the entertainee has identified in the environment. In some of these practices, the entertainee guesses wrongly, in which case the second feature differs from the first feature. In others, the entertainee guesses correctly, in which cases the first and second features are the same feature.

Additional practices include using the spatial intelligence to identify a feature in the environment and activating a haptic element, a pointer, a cabin light, a speech interface, or any combination thereof to assist the entertainee in identifying the feature.

Also, among the practices are those in which gathering the spatial intelligence includes receiving image information from a camera pointed at the entertainee. This image information is then used to infer the entertainee's gaze direction for use while executing the entertainment application.

In other practices, the spatial intelligence includes information indicative of a path being traced in the environment by the entertainee. Among these are embodiments in which gathering the spatial intelligence includes using a camera having the entertainee in a field-of-view thereof to observe the entertainee making a gesture that is indicative of a first object from a set of objects. Based on the observation, a second object is selected from the set of objects and information indicative of the second object is communicated to the entertainee. In some cases, the second object differs from the first object. In other cases, the first and second object do not differ.

Yet other practices include those in which gathering the spatial intelligence includes receiving image information from a camera pointed at the entertainee and using spatial intelligence gleaned from that image information while executing the entertainment application. Such spatial intelligence takes a variety of forms such the orientation of the entertainee's head, the entertainee's body posture, the direction of the entertainee's gaze, or the occurrence of a gesture, such as a hand gesture.

In another aspect, the invention features electronic circuitry that implements an infotainment system that is integrated into a passenger vehicle. The infotainment system includes an automotive assistant and an entertainment module. The automotive assistance communicates with a peripheral-device set for gathering spatial intelligence concerning the vehicle's environment. The entertainment module executes a spatially-cognizant entertainment application for entertaining an entertainee in the passenger vehicle. The automotive assistant uses the spatial intelligence concerning the vehicle's environment to cause execution of the entertainment application to depend at least in part on the spatial intelligence.

In some embodiments, the interaction of the entertainment application with the entertainee depends on the spatial intelligence.

Among the embodiments are those in which the peripheral-device set includes a camera and a geolocation module. The camera is oriented to receive image information from outside of the vehicle. It provides this image information to the automotive assistant. The geolocation module provides, to the automotive assistant, location information that is indicative of the vehicle's geographic location. The automotive assistant causes execution of the entertainment application to depend at least in part on the image information and the location information.

In some embodiments, the automotive assistant uses the gathered spatial intelligence to identify a feature in the vehicle's environment and to provide the entertainee with information to assist the entertainee in identifying the feature. Such assistance might take the form of a hint or a clue spoken through a speech interface. Or it could also be a non-verbal hint or clue such as activation of haptic element, a pointer, or cabin lighting.

In other embodiments, the automotive assistant uses the spatial intelligence to identify a feature in the vehicle's environment and, in response to requests from the entertainee, to provide the entertainee with information concerning the feature.

Still other embodiments include those in which the automotive assistant uses the spatial intelligence to identify a first feature in the vehicle's environment, to assist the entertainee in identifying the feature, and to receive, from the entertainee, information identifying the first feature.

In some embodiments, the automotive assistant uses the spatial intelligence to identify a feature in the vehicle's environment, to provide the entertainee with a hint to assist the entertainee in identifying the feature, to obtain, from the peripheral-device set, image information indicative of a gesture by the entertainee, and to interpret the gesture as identifying the entertainee's expectation of a direction to the feature in the vehicle's environment.

In other embodiments, the infotainment system further includes a speech interface that is in communication with the automotive assistant to permit the automotive assistant to communicate with the entertainee using speech. In some of these embodiments, the automotive assistant uses the spatial intelligence to identify a first feature in the environment, to assist the entertainee in identifying the feature, and to obtain, from a speech interface, information indicative of a second feature that the entertainee has identified in the environment, the second feature being different from the first feature. In others of these embodiments, the automotive assistant uses the spatial intelligence to identify a feature in the environment and uses the speech interface to provide spoken assistance in identifying the feature.

Still other embodiments feature a haptic element that is controllable by the automotive assistant. In such embodiments, the automotive assistant uses the spatial intelligence to identify a feature in the environment and to activate the haptic element to assist the entertainee in identifying the feature.

Also among the embodiments are those that include a cabin light that is in the passenger vehicle and that is controllable by the automotive assistant. In these embodiments, the automotive assistant uses the spatial intelligence to identify a feature in the environment and to activate the cabin light to assist the entertainee in identifying the feature.

In still other embodiments, a pointer in the passenger vehicle is configured to draw the entertainee's attention to a particular direction. In such embodiments, the automotive assistant is configured to use the spatial intelligence to identify a feature in the environment and to activate the pointer to draw the entertainee's attention to a direction towards the feature.

Also among the embodiments are those in which the entertainment application receives, from the entertainee, information that concerns a feature in the environment. This information does not actually identify the feature. The entertainment application then uses spatial intelligence received from the peripheral-device set to identify this feature.

In some embodiments, the peripheral-device set includes a camera that is pointed at the entertainee or that otherwise has the entertainee in its field-of-view. Among these are embodiments in which the automotive assistant gathers the spatial intelligence by receiving image information from the camera, to infer a gaze direction of the entertainee, and to provide the gaze direction to the entertainment application, wherein interaction between the entertainment application and the entertainee depends at least in part on the gaze direction. Also among these embodiments are those in which the automotive assistant observes the entertainee making a gesture that is indicative of a first object from a set of objects provides the spatial intelligence to the entertainment application, which then uses this spatial intelligence to select a second object from the set of objects and to communicate information indicative of the second object to the entertainee. Also among these embodiments are those in which the spatial intelligence results in an inference of the entertainee's head orientation or body posture, which the entertainment application then relies upon while interacting with the entertainee. The above embodiments include those in which interaction of the entertainment application with the entertainee is influenced at least in part by the observed feature, whether it be the entertainee's head orientation, a gesture, such as a hand gesture, or a gaze direction, body posture, or any combination thereof as well as those in which operation of the entertainment application depends at least in part on any one or more of the foregoing observables.

Still other embodiments include those in which the spatial intelligence includes information indicative of a path being traced in the environment by the entertainee.

A variety of entertainment applications are within the scope of the claims. Among these are entertainment applications that amount to a game in which the automotive assistant is a player.

As used herein, to say that a structural feature does a thing is equivalent to saying that the structural feature is configured to do that thing. As an example, to say that the automotive assistant is configured to provide certain information is equivalent to saying that the automotive assistant is configured to provide that information or to saying that the automotive assistant has the necessary structure needed to provide that information. In general, all structural elements that are identified as having an intended use shall be construed as also having structural features that permit the structural element to carry out that use.

In another aspect, the invention features a tangible and non-transitory computer-readable medium having encoded thereon instructions that, when executed by an infotainment system that is integrated into a passenger vehicle, cause the infotainment system to implement an automotive assistant. This automotive assistant uses a peripheral-device set connected to the infotainment system to gather spatial intelligence from the vehicle's environment. It then uses that spatial intelligence while executing an entertainment application. Among these entertainment applications are those in that implement game in which the entertainee is a first player of the game and the automotive assistant is a second player of the game.

In yet another aspect, the invention features electronic circuitry that implements an infotainment system that is integrated into a passenger vehicle. The infotainment system includes an automotive assistant and an entertainment application. The automotive assistant, which is in data communication with peripheral devices, uses spatial intelligence gathered from those peripheral devices. This spatial intelligence concerns the vehicle's environment. It then uses this spatial intelligence while executing the entertainment application.

In some embodiments, execution of the entertainment application makes use of corresponding first and second data-processing systems in which the first data-processing system is within the vehicle and the second data-processing system is outside the vehicle. Among these are embodiments in which the second data-processing system is a cloud-based data-processing system. In such embodiments, it is useful to provide the vehicle with a communication interface that permits communication between the two data-processing systems. Among these are embodiments in which a portion of the spatial intelligence is provided by the second-data processing system.

In one aspect, the invention features a non-abstract method that includes the non-abstract use of an infotainment system of a passenger vehicle to entertain an entertainee in the passenger vehicle. Using the infotainment system includes executing an automotive assistant that is configured to execute an entertainment application. An example of such an application is one that implements a game in which the automotive assistant functions as one player and the entertainee is another player. This automotive assistant executes the steps of gathering spatial intelligence about the environment of the vehicle from peripheral devices that are physically connected to the infotainment system. It then uses that gathered spatial intelligence while executing the entertainment application. Despite numerous attempts at doing so, it has proven thus far impossible to execute the above method entirely within the human mind or with the assistance of pencil and paper. It has also been found experimentally that execution of the method consumes electrical energy and results in waste heat, and thus directly affects the physical environment of the real world rather than the non-physical and abstract environment of the imaginary and abstract world. The infotainment system itself comprises matter, and specifically, baryonic matter.

The method and apparatus as described and claimed herein are non-abstract. No description has been offered of any abstract implementations. Accordingly, the claims are to be construed as covering only non-abstract subject matter. Any person who construed them otherwise would be construing them incorrectly and without regard to the specification.

Applicant, acting as his own lexicographer, hereby defines "non-abstract" as the complement of "abstract" as that term has been defined by the courts of the United States as of the filing date of this application.

The method and apparatus as described herein is also one that has a technical effect. In many cases, the technical effect will be non-obvious. However, it exists. Therefore, any person who construes the claims as lacking a technical effect is merely displaying an inability to discern the technical effect as a result of its non-obviousness.

The processing system that executes the method is not a generic computer. It is a specialized digital electronic device that is specially adapted for operation in a passenger vehicle to accommodate the various technical constraints imposed by that environment including limited space and power and operation in environments of extreme heat or cold and resistance to shock and other forces that result from acceleration.

Additionally, though it is convenient to implement the method using software instructions, it is known that virtually any set of software instructions can be implemented by specially designed hardware, which is typically provided as an application-specific integrated circuit. The claims presented herein are also intended to cover such an implementation.

These and other features of the invention, as well as their advantages, will be apparent from the following detailed description, and from the claims.

DETAILED DESCRIPTION

Figure 1:
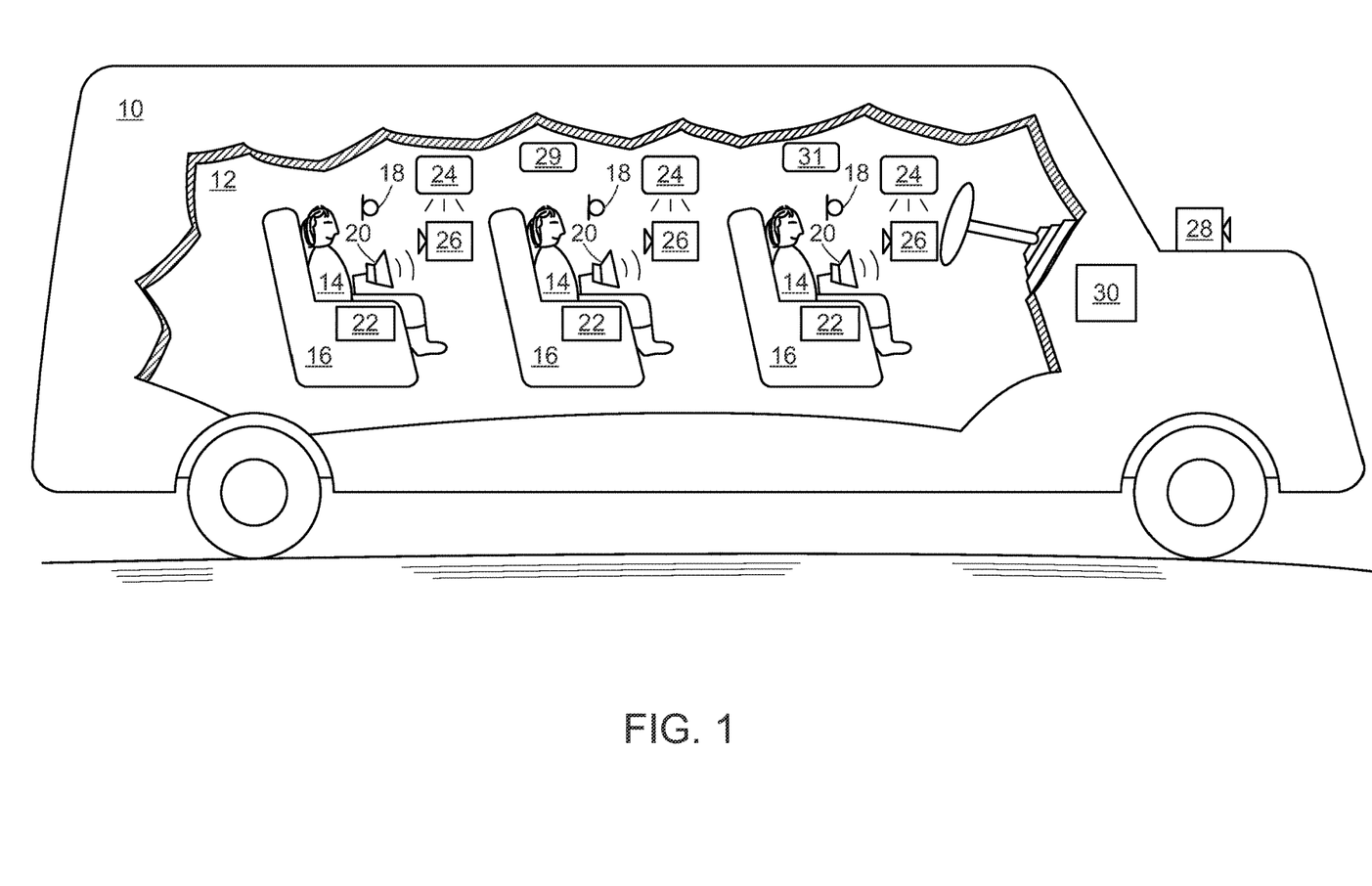
FIG. 1 shows a vehicle having an automotive processing-unit in communication with a variety of peripheral devices.

FIG. 1 shows a vehicle 10 having a passenger cabin 12 in which prospective entertainees 14 are seated in seats 16. Each seat 16 has an associated microphone 18, a speaker 20, and a haptic element 22. Within the cabin 12 are various cabin lights 24.

The vehicle 10 also includes internal cameras 26 and external cameras 28. The internal cameras 26 are directed towards various portions of the cabin 12. An internal camera 26 therefore often has an entertainee 14 in its field of view. The external cameras 28 are directed towards the vehicle's environment.

In some embodiments, the vehicle 10 includes a projector 29 and a pointer 31. These are used in connection with the execution of certain entertainment applications as described in connection with FIGS. 4-6.

Figure 2:
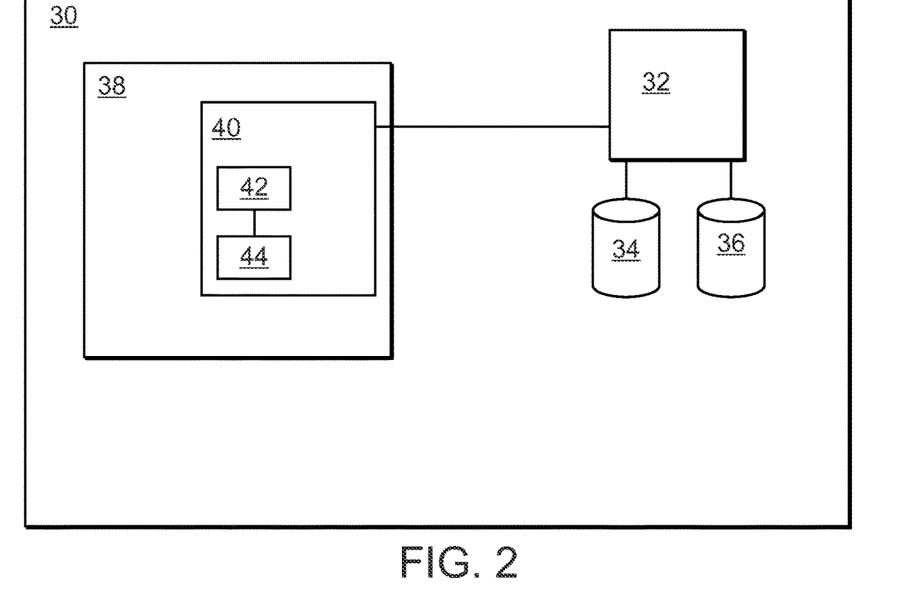
FIG. 2 shows components of a head unit in the automotive processing-unit of FIG. 1.

The vehicle 10 further includes an on-board automotive processing unit 30, details of which can be seen in FIG. 2.

Referring now to FIG. 2, the automotive-processing unit 30 features an on-board navigation system 32 that receives satellite signals, processes them to output spatial coordinates, and displays a representation of the vehicle's spatial environment on a map selected from a map database 34. In addition, the on-board navigation system 30 has access to a feature database 36 that provides information concerning points-of-interest corresponding to various spatial coordinates.

The automotive-processing unit 30 also includes an infotainment system 38 that includes a head unit 40 having a processor 42 and a memory 44. The infotainment system 38 interfaces with a peripheral-device set that includes one or more peripheral devices. Examples of peripheral devices include one or more of: the microphones 18, the loudspeakers 20, the haptic elements 22, the cabin lights 24, the cameras 26, 28, the projector 29 and the pointer 31.

Figure 3:
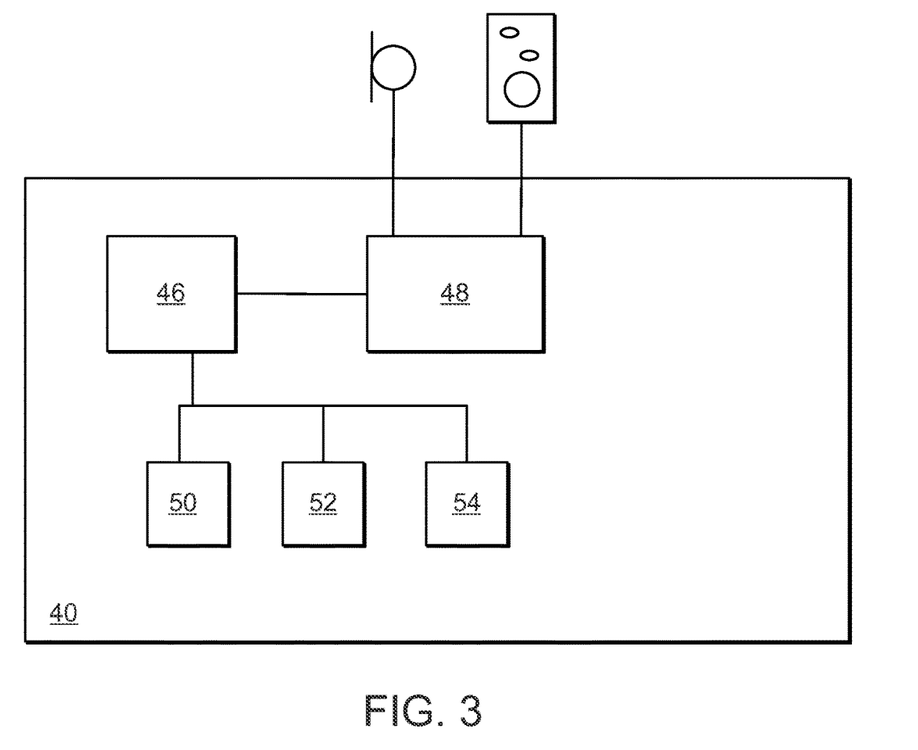
FIG. 3 shows the architecture of a head unit in the automotive processing-unit shown in FIG. 1 that functions independently of any connection to a remote server, for example via the cloud.

Referring now to FIG. 3, an automotive assistant 46 executing in the head unit 40 functions as the head unit's operating system. The automotive assistant thus enables the head unit 30 to execute various applications, among which is a speech interface 48 and one or more spatially-cognizant entertainment applications 50, 52, 54.

Examples of spatially-cognizant entertainment applications 50, 52, 54 include games in which the vehicle acts as one player. Such games can be played by one person or by two or more persons. Other examples of entertainment applications include those that generate a virtual world or experience, educational applications, or similar applications that entertain an entertainee to distract the entertainee from the boredom of an extended drive. Each such spatially-cognizant entertainment application exploits the spatial intelligence that arises from information gleaned from the various peripheral devices that are connected to the infotainment system 38. The illustrated embodiment features first, second, and third spatially-cognizant entertainment applications 50, 52, 54.

A first entertainment application 50 implements a feature-identification game that relies on spatial intelligence to either pose or accept challenges concerning the existence of various features or points-of-interest in the vehicle's environment and sensory feedback to infer the entertainee's intent. This environment includes both the cabin's interior and its exterior. Examples of such features or points-ofinterests include buildings, monuments, landmarks, and geographic features such as bodies of water, whether still or flowing, including lakes, rivers, and waterfalls, and areas of noticeable gradient, whether positive or negative, on the landscape, such as hills, cliffs, escarpments, and buttes. Features and points-of-interest can also include transient features such as another vehicle on the road or parked.

The feature-identification game is played by first and second players, one of which is a human player, i.e., the entertainee, and the other of which is a non-human player that is implemented by the first entertainment application 50 itself.

It is therefore apparent that the term "player" does not necessarily mean a human being. In addition, the term "player" is a logical construct that is not restricted to one human being but can represent a set of human beings that cooperate to function as a "player." Thus, one can regard a "player" as a "playing entity."

In the context of the games described herein, it is possible for the entertainee and the automotive assistant to switch roles. To promote compactness of expression, the logical terms "first player" and "second player" will be used with the understanding that the entertainee and the automotive assistant can switch roles.

The first player selects the feature. The second player attempts to guess, based on one or more hints or clues, the particular features that the first player selected.

Figure 4:
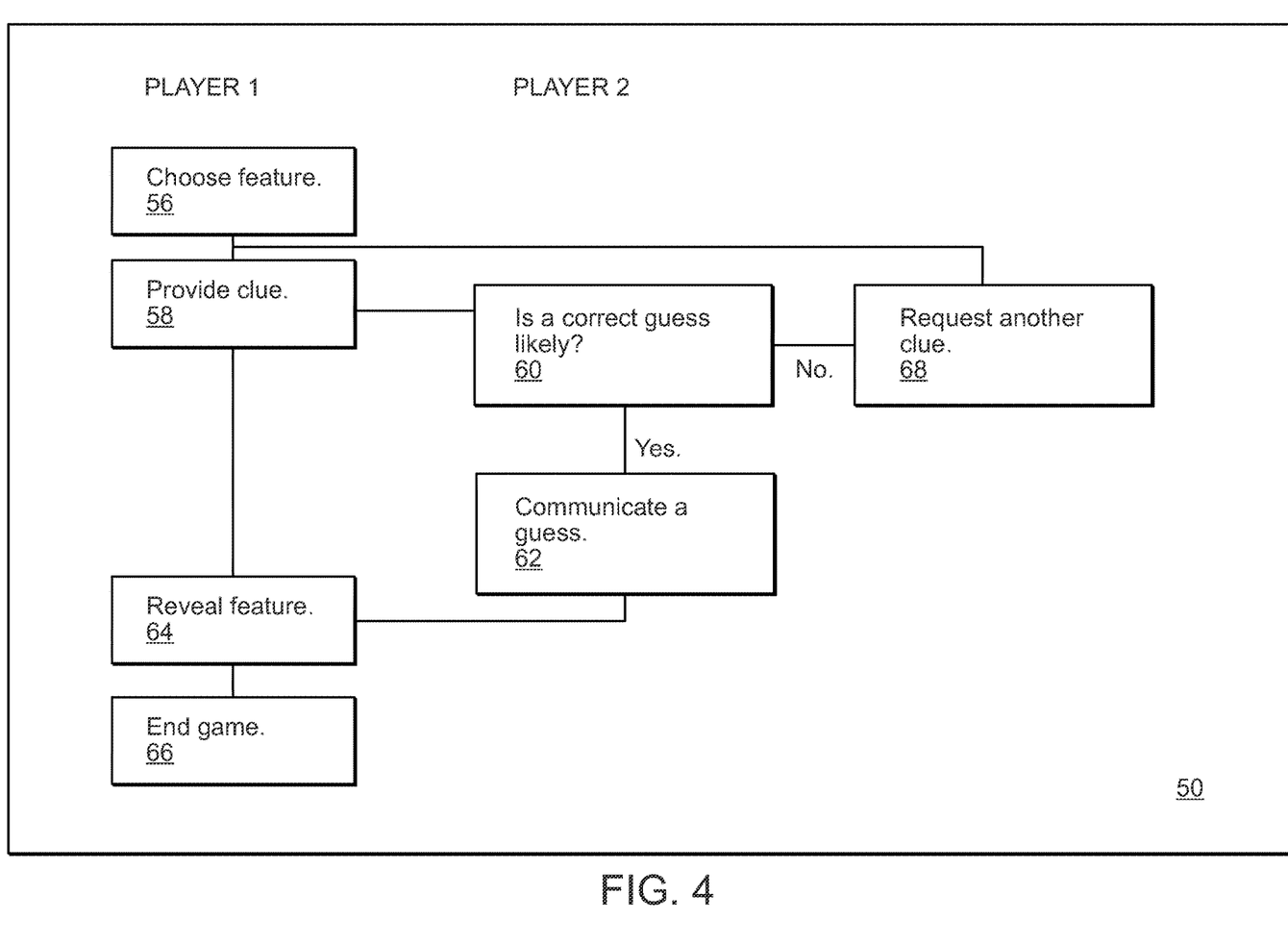
FIG. 4 is a flow-chart for a feature-searching game to be played by the head unit of FIG. 2.

As shown in FIG. 4, the feature-identification game implemented by the first entertainment application 50 begins with the first player choosing a feature in the environment (step 56). After providing a suitably chosen clue to the second player the first player invites the second player to guess the feature (step 58).

The second player then evaluates the likelihood of guessing the feature correctly (step 60). If the likelihood is sufficiently high, the second player communicates a guess to the first player (step 62). In response, the first player reveals the chosen feature (step 64). This completes the game (step 66) with the winner of the game being a function of the distance between the guess and the chosen feature.

On the other hand, if the second player finds that the likelihood of guessing correctly is too low, the second player asks the first player for another clue (step 68). The game then continues in the same manner that it would have continued had the second player not done so.

When acting as second player, the automotive assistant 46 has access to considerable contextual information that may reveal the entertainee's chosen feature. In some cases, the automotive assistant 46 infers the entertainee's direction of gaze by inspecting an image provided by the internal camera 26. This is useful because the entertainee's gaze may provide a clue concerning the location of the chosen feature.

In some of these cases, the gaze direction suggests that the entertainee has chosen a feature that is external to the vehicle 10. Having inferred this, the automotive assistant 46 inspects the output of the on-board navigation system 32 and the features in the associated feature database 36 for clues concerning the entertainee's chosen feature. For example, if the automotive assistant 46 determines, from the internal camera 26, that the entertainee's is or was gazing in a northerly direction, the automotive assistant 46 uses the feature database 36 to ascertain the existence and nature of a point-of-interest in that direction and, in some cases, provides that feature as a guess (step 62).

On the other hand, if the automotive assistant 46 fails to identify, using the feature database 36, any likely point-of-interest in the northerly direction, it may mean that the entertainee has chosen a transient feature, such as a passing car or a parked food-truck. In that case, the automotive assistant 46 inspects the image seen by an external camera 28 that is pointing in the northerly direction to see if any feature of interest is visible. If the automotive assistant 46 identifies a transient feature, such as a passing car or a parked food-truck, the second player proposes that feature as a guess (step 62).

Even without information on the gaze direction, the automotive assistant 46 is able to access the feature database 36 to determine what features are visible from the current location. The automotive assistant 46 ranks these features in order of prominence and uses them as a basis for guessing what feature the entertainee has chosen.

When acting as first player, the automotive assistant 46 provides the entertainee with clues by using any of several communication modes. These include speaking through the speech interface 48, selectively activating the cabin lights 24, activating selected haptic elements 22, or pointing with the pointer 31.

The clues can be provided upon the entertainee's request or spontaneously. For example, in some implementations, the automotive assistant 46 observes, using the internal camera, the direction in which the entertainee is gazing and provides feedback depending on the angular separation between the direction of the entertainee's gaze and the direction to the chosen feature. Such feedback can be provided by activation of cabin lights or haptic elements as needed. The feedback can be positive or negative depending on changes in the gaze direction, and in particular on the sign of the time-derivative of the angular separation with urgency of the feedback increasing, in the case of positive feedback, as the angular separation approaches zero and, in the case of negative feedback, as the angular separation increases.

The second entertainment application 52 implements a second game similar to the feature-identification game, which was implemented by the first entertainment application 50. A distinction between the two is that the act communicating a guess (step 62) is carried out non-verbally rather than verbally, for example by a gesture directed towards the chosen feature. In this case, the automotive assistant 46 uses the internal camera 26 to identify motion by the entertainee that could be interpreted as a gesture directed toward the selected feature.

In those embodiments in which the automotive-processing unit 30 lacks a mechanism for making a gesture, the automotive assistant 46 can only take the role of the first player. However, in those embodiments that include a pointer 31, the automotive assistant 46 controls the pointer 31. This makes it possible for the automotive assistant 46 to also take on the role of the second player.

Embodiments of the pointer 31 include a mechanical pointer driven to rotate by a servo motor and having an arm that points in a particular direction under the control of the second game 52. In other embodiments, the pointer 31 comprises a set of LEDs arranged in radial lines and pointing is achieved by illuminating the radial line that points in the required direction. In other embodiments, the cabin lights 24 can be used as pointers, though with limited resolution. Thus, to point in a northerly direction, the second entertainment application 52 may flash whichever cabin light 24 is closest to facing that direction. Such a pointer 31 can also be used in the first entertainment application 50 as a way for the second player to communicate clues to the first player.

Figure 5:
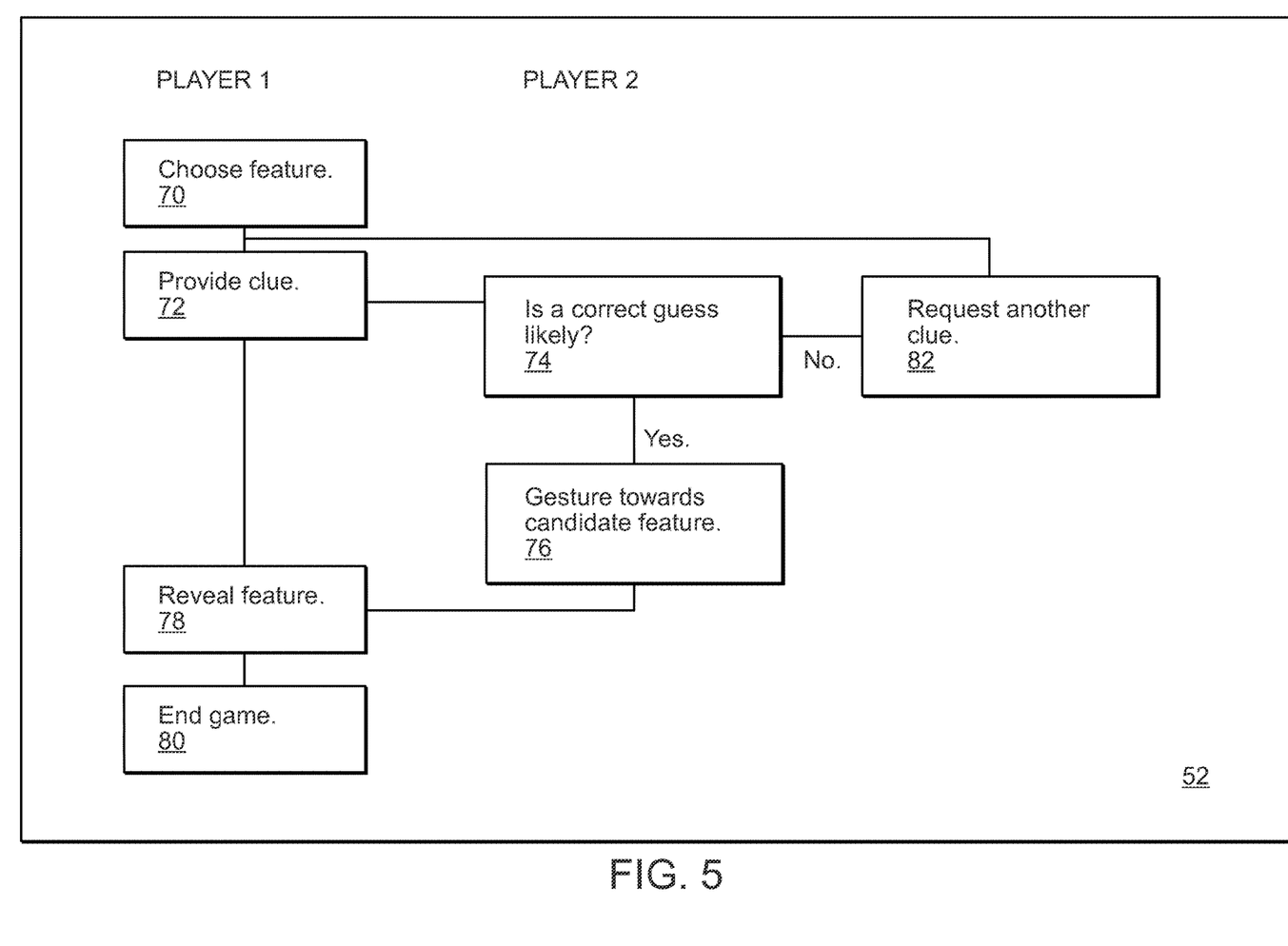
FIG. 5 is a flow-chart for a feature-targeting game to be played by the head unit of FIG. 2.

As shown in FIG. 5, the second game, like the first game, begins with the first player choosing a feature (step 70). The first player then provides a clue concerning this chosen feature to the second player (step 72). The second player evaluates the clue and considers whether enough information is available to identify a candidate-chosen feature (step 74). If the second player has sufficient confidence, the second player communicates the candidate-chosen feature by making a suitable gesture in that direction (step 76).

In response, the first player reveals the chosen feature (step 78). This completes the game (step 80) with the winner of the game being a function of the distance between the candidate-chosen feature and the chosen feature.

On the other hand, if the second player is insufficiently confident in the correctness of the candidate chosen-feature, or if the second player lacks information to even nominate a candidate chosen-feature, the second player asks the first player for another clue (step 82). The game then continues in the same manner that it would have continued had the second player not done so.

The third game 54 is an object-identification game that is played by first and second players, one of which is the entertainee and the other of which is the automotive assistant 46.

In the third game 54, the act of providing a clue 58 is carried out non-verbally. In one embodiment, the first player provides the clue by drawing an object on a virtual canvas. The object is one selected from a set whose elements are available objects.

The first player traces out the object by moving a structure along a path in free space. The second player observes the moving structure as a function of time in an effort to integrate these into a path. Having done so, the second player considers which of the objects in the set most closely matches the observed path.

In those cases, in which the first player is the entertainee, the moving structure is most commonly a moving finger. In such cases, the automotive assistant 46 relies on an internal camera 26 to observe the moving finger and to infer its spatial coordinates over time, thus permitting assembly of a path. In some cases, more than one internal camera 26 is relied upon. This permits information from parallax effects to be relied upon when inferring the coordinates of the moving finger.

In the foregoing embodiment, the virtual canvas is a region of free space accessible to the first player. However, in some cases, it is useful to ease the computational burden on the automotive assistant 46 by bounding the available canvas. This can be carried out by causing the projector 29 to project lines marking a region on a two-dimensional surface within the vehicle. When extended into the third dimension, these define planes that bound the space in two dimensions, thus forming a smaller virtual canvas. The entertainee then traces out the relevant path within that bounded volume.

The third entertainment application 54 implements a third game that can be viewed as similar to the first game but with the act of providing a clue (step 58) being carried out by drawing a path on a virtual canvas. In response to requesting another clue (step 68), the entertainee would carry out a second attempt to draw the same path.

Figure 6:
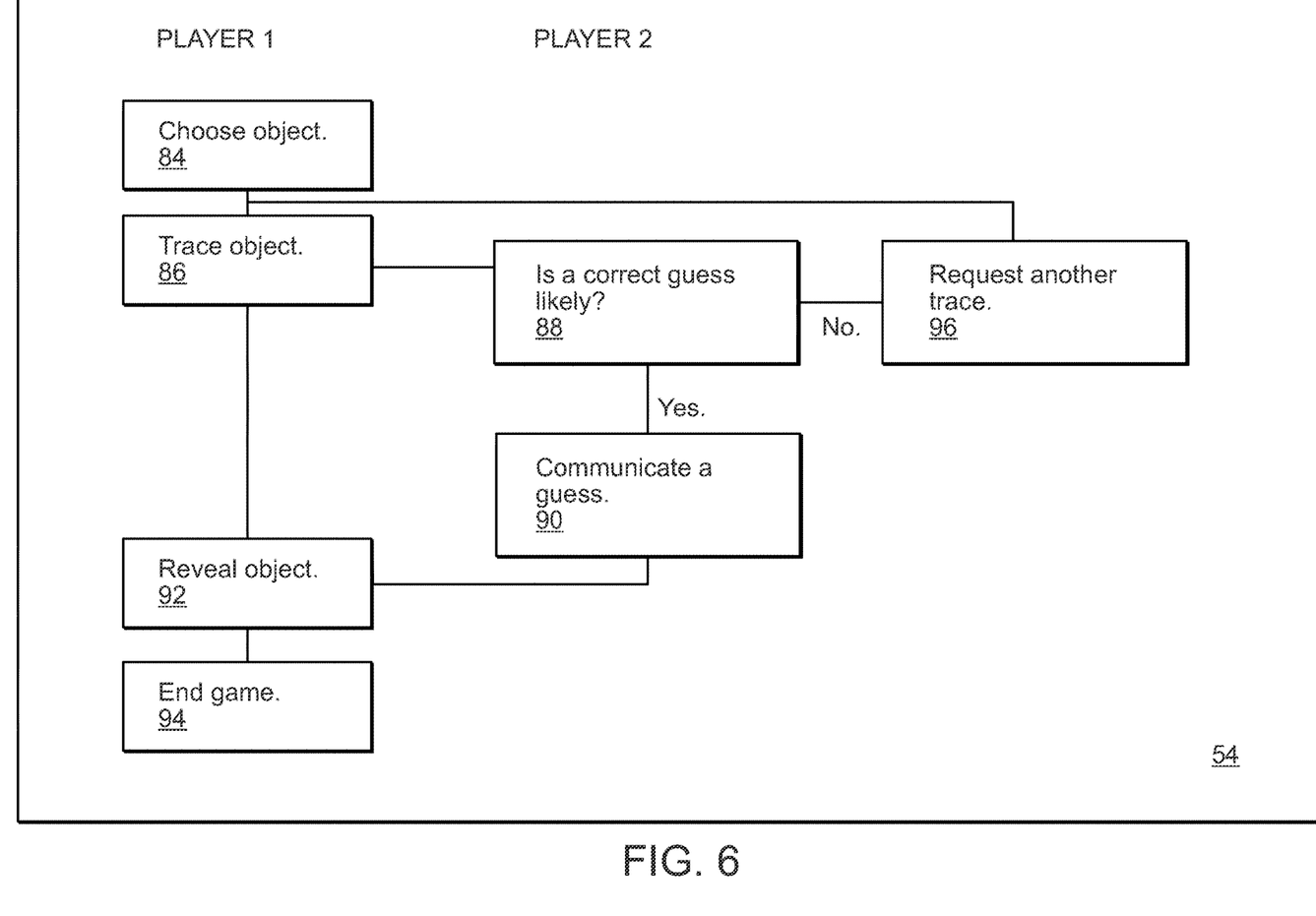
FIG. 6 is a flow-chart for an object-identification game to be played by the head unit of FIG. 2.

As shown in FIG. 6, the third game begins with the game's first player choosing an object from a list of possible objects or object classes (step 84). The first player then traces the object on a virtual canvas invites the second player to guess the object (step 86).

The second player then evaluates the likelihood of guessing the object correctly (step 88). If the likelihood is sufficiently high, the second player communicates the guess to the first player (step 90). In response, the first player reveals the chosen object (step 92). This completes the game (step 94) with the winner of the game being a function of the distance between the second player's guess and the chosen object.

On the other hand, if the second player finds that the likelihood of guessing correctly is too low, the second player asks the first player to re-trace the object (step 96). The game then continues in the same manner that it would have continued had the second player not done so.

Figure 7:
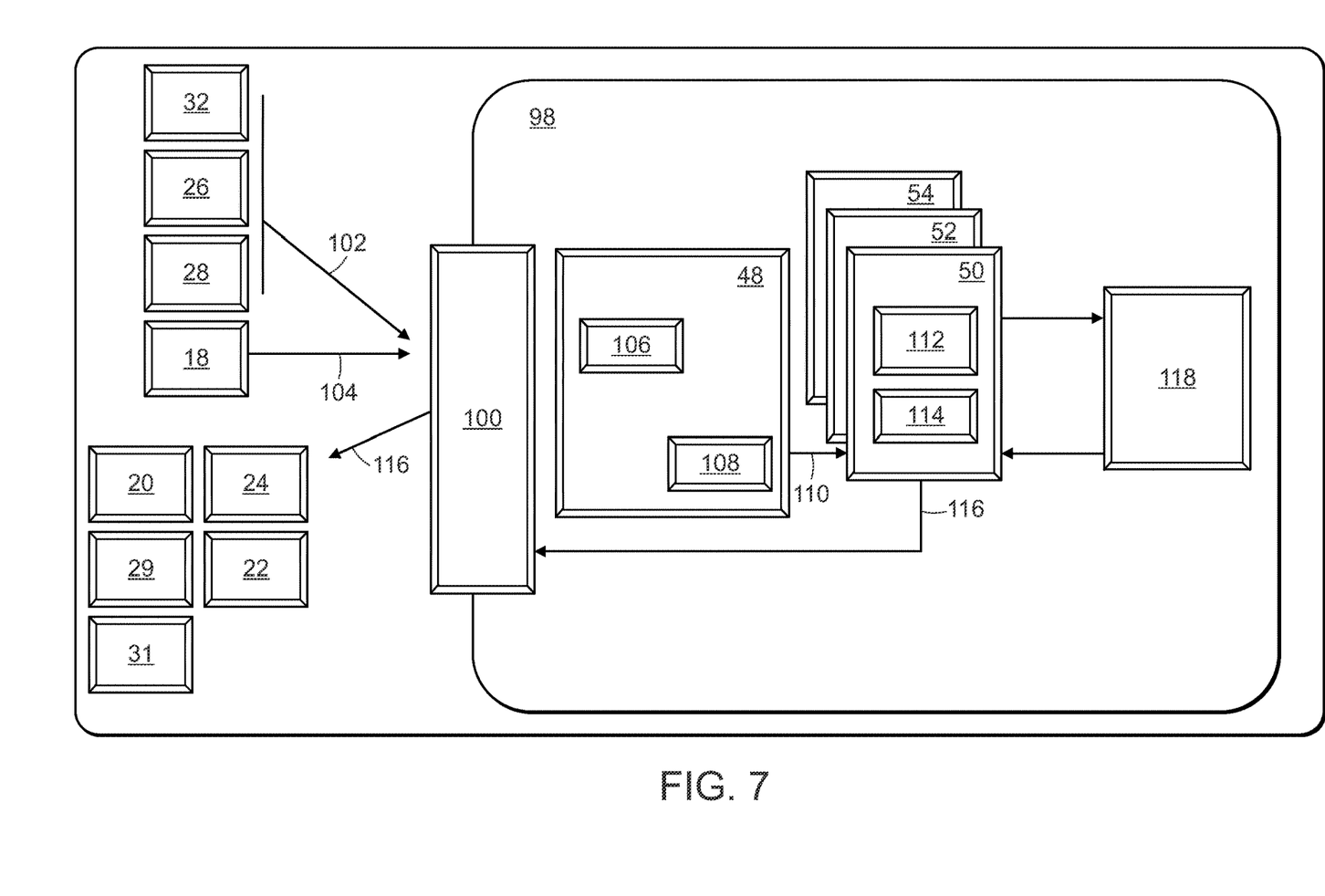
FIG. 7 shows the architecture of an alternative embodiment of a head unit in the automotive processing-unit shown in FIG. 1 that, unlike the embodiment shown in FIG. 3, which functions independently of any connection to a remote server, for example via the cloud, does not function independently of any remote server and in fact maintains a connection to remote server, for example via, the cloud, during operation thereof.

A difficulty that arises in implementing the spatially-cognizant entertainment applications is that the computational load can be quite heavy. As such, it may be difficult to carry out all computations using an automotive processing-system 39 that is on board the vehicle 10. It is thus useful to offload some or all of the computations to a remote server 98.

The architecture shown in FIG. 7 provides a cloud interface 100 that receives sensor data 102 and speech data 104 and provides them both to the remote computer 98. The sensor data 102 comes from the internal and external cameras 26, 28 and from the on-board navigation system 32. The speech data 104 comes from the microphone 18.

The speech interface 48, which is implemented on the remote computer 98, includes an automatic speech-recognition module 106 and a natural-language understanding module 108. The automatic speech-recognition module 106 identifies semantic units, such as words and phrases, in a stream of sound. The natural-language understanding unit 108 maps the identified semantic units into meanings. For example, in those embodiments in which the entertainment application implements a game, the speech interface 48 provides a selected game with application input 110 that includes the sensor data 102 and the speech data 104.

The entertainment application includes application logic 112 that uses the application input 110 to execute the entertainment application 50. This results in an entertainment status. A feedback generator 114 that provides feedback information 116 on the entertainment status. The feedback generator 114 typically includes a natural-language generator that outputs either text or speech based on text. The feedback information 116 includes text and/or speech and, when appropriate, information concerning a point-of-interest. This feedback information is then transmitted back to the vehicle 10 for communication to the entertainee via one or more modes of communication, such as a speaker 20, a haptic element 22, cabin lights 24, the pointer 31, and/or the projector 29. In some embodiments, the projector 29 is a virtual-reality projector that projects images.

The remote server 98 further maintains a spatial-intelligence module 118 that includes information concerning points-of-interest. Based on location data provided by the navigation system 32, the spatial-intelligence module 118 provides information concerning points-of-interest that may be relevant to the spatially-cognizant entertainment application 50. Such information forms part of the feedback information 116.

It is to be understood that the foregoing description is intended to illustrate and not to limit the scope of the invention, which is defined by the scope of the appended claims. Other embodiments are within the scope of the following claims.

What is claimed is:

1. An apparatus comprising electronic circuitry that implements an infotainment system that is integrated into a passenger vehicle, said infotainment system comprising an automotive assistant that is in data communication with a peripheral-device set for gathering spatial intelligence concerning said vehicle's environment and an entertainment module that is configured to execute an entertainment application for entertaining an entertainee in said passenger vehicle, wherein said automotive assistant uses said spatial intelligence concerning said vehicle's environment to cause execution of said entertainment application to depend at least in part on said spatial intelligence and wherein using said spatial intelligence comprises identifying a feature in said vehicle's environment.

2. The apparatus of claim 1, wherein said peripheral-device set comprises a camera and a geolocation module, wherein said camera is oriented to receive image information from outside of said vehicle, wherein said camera provides said image information to said automotive assistant, wherein said geolocation module provides, to said automotive assistant, location information, said location information being indicative of the geographic location of said vehicle, and wherein said automotive assistant is configured to cause execution of said entertainment application to depend at least in part on said image information and said location information.

3. The apparatus of claim 1, wherein said automotive assistant is configured to provide said entertainee with information to assist said entertainee in identifying said feature.

4. The apparatus of claim 1, wherein said automotive assistant is configured to respond to requests from said entertainee by providing said entertainee with information concerning said feature.

5. The apparatus of claim 1, wherein said automotive assistant is configured to assist said entertainee in identifying said feature and to receive, from said entertainee, information identifying said first feature.

6. The apparatus of claim 1, wherein said automotive assistant is configured to provide said entertainee with a hint to assist said entertainee in identifying said feature, to obtain, from said peripheral-device set, image information indicative of a gesture by said entertainee, and to interpret said gesture as identifying said entertainee's expectation of a direction to said feature in said vehicle's environment.

7. The apparatus of claim 1, wherein said infotainment system further comprises a speech interface that is in communication with said automotive assistant to permit said automotive assistant to communicate with said entertainee using speech, wherein said automotive assistant is configured to assist said entertainee in identifying said feature and to obtain, from a speech interface, information indicative of a second feature that said entertainee has identified in said environment, said second feature being different from said first feature.

8. The apparatus of claim 1, further comprising a haptic element that is controllable by said automotive assistant, wherein said automotive assistant is configured to activate said haptic element to assist said entertainee in identifying said feature.

9. The apparatus of claim 1, further comprising a cabin light that is in said passenger vehicle and that is controllable by said automotive assistant, wherein said automotive assistant is configured to activate said cabin light to assist said entertainee in identifying said feature.

10. The apparatus of claim 1, further comprising a pointer in said passenger vehicle, said pointer being configured to draw said entertainee's attention to a particular direction, wherein said automotive assistant is configured to activate said pointer to draw said entertainee's attention to a direction towards said feature.

11. The apparatus of claim 1, wherein said infotainment system further comprises a speech interface that is in communication with said automotive assistant to permit said automotive assistant to communicate with said entertainee using speech, wherein said automotive assistant is configured to use said speech interface to provide spoken assistance in identifying said feature.

12. The apparatus of claim 1, wherein said automotive assistant is configured to receive, from said entertainee, information that concerns a feature in said environment without identifying said feature and to use spatial intelligence received from said peripheral-device set to identify said feature.

13. The apparatus of claim 1, wherein said peripheral-device set comprises a camera pointed at said entertainee, wherein said automotive assistant is configured to gather said spatial intelligence by receiving image information from said camera, to infer a gaze direction of said entertainee, and to provide said gaze direction to said entertainment application, wherein interaction between said entertainment application and said entertainee depends at least in part on said gaze direction.

14. The apparatus of claim 1, wherein said spatial intelligence comprises information indicative of a path being traced in said environment by said entertainee.

15. The apparatus of claim 1, wherein said peripheral-device set comprises a camera having said entertainee in a field-of-view thereof, wherein said automotive assistant is configured to gather said spatial intelligence by using said camera to observe said entertainee making a gesture that is indicative of a first object from a set of objects and to provide said spatial intelligence to said entertainment application, wherein based on said spatial intelligence, said entertainment application selects a second object from said set of objects, and causes communication of information indicative of said second object to said entertainee, wherein said second object differs from said first object.

16. The apparatus of claim 1, wherein said peripheral-device set comprises a camera that is pointed at said entertainee, wherein said automotive assistant is configured to infer said entertainee's head orientation and to provide said head orientation to said entertainment application, which uses said head orientation while interacting with said entertainee, wherein interaction of said entertainment application with said entertainee is influenced at least in part by said entertainee's head orientation.

17. The apparatus of claim 1, wherein said peripheral-device set comprises a camera pointed at said entertainee, wherein said image information includes information indicative of said entertainee having made a hand gesture, wherein said automotive assistant is configured to provide said information to said entertainment application for use by said entertainment application when interacting with said entertainee, wherein operation of said entertainment application depends at least in part on said entertainee's hand gesture.

18. The apparatus of claim 1, wherein said peripheral-device set comprises a camera pointed at said entertainee, wherein said image information includes information indicative of said entertainee's body posture, wherein said entertainment application uses said information indicative of said entertainee's body posture while interacting with said entertainee, whereby operation of said entertainment application depends at least in part on said entertainee's body posture.

19. The apparatus of claim 1, wherein said entertainment application is a game in which said automotive assistant is a player.

20. A method comprising using an infotainment system of a passenger vehicle to entertain an entertainee in said passenger vehicle, wherein using said infotainment system comprises executing an automotive assistant that is configured to execute a spatially-cognizant entertainment application to entertain said entertainee in said vehicle, wherein said automotive assistant executes the steps of gathering spatial intelligence about the environment of said vehicle from peripheral devices connected to said infotainment system and using said spatial intelligence to identify a feature in said environment, whereby operation of said entertainment application depends at least in part on said spatial intelligence.

21. The apparatus of claim 19, wherein said entertainment application is one of a plurality of entertainment applications, each of which is a game, wherein at least one of said games transitions between a state in which said automotive assistant attempts to identify a feature identified by said entertainee based on clues provided to said automotive assistant by said entertainee and a state in which said entertainee attempts to identify a feature identified by said automotive assistant based on clues provided by said automotive assistant to said entertainee.

22. The apparatus of claim 1, wherein said entertainment application is a game having first and second playing entities, wherein said first playing entity chooses a feature in said environment and, wherein, in response to each of a plurality of requests by said second playing entity, said first playing entity provides a clue to said second playing entity for use by said second playing entity in guessing said feature, wherein, based on said clue, said second playing entity communicates a guess to said first player, said guess being an attempt to identify said feature by said second playing entity, and wherein said first playing entity receives an incorrect guess from said first playing entity and notifies said second playing entity of said incorrect guess.

23. The apparatus of claim 1, wherein said entertainment application is an object-identification game in which a first player provides a non-verbal clue by drawing an object on a virtual canvas, said object having been selected from a set whose elements are available objects, wherein drawing said object on said virtual canvas comprises said first player tracing out said object in free space, and wherein said second player observes said first player drawing said object on said virtual canvas and considers which of said objects in said set most closely matches said drawing.

24. The apparatus of claim 1, wherein said peripheral-device set comprises a geolocation module that provides location information and wherein identifying said feature comprises identifying said feature based at least in part on said location information.

25. The apparatus of claim 1, wherein said automotive assistant comprises an operating system of said infotainment system.

26. The apparatus of claim 1, wherein said automotive assistant is configured to enable a head unit of said infotainment system to execute a speech interface and a plurality of spatially-cognizant entertainment applications.

* * * * *